US009164979B1

(12) United States Patent
Dubey et al.

(10) Patent No.: US 9,164,979 B1
(45) Date of Patent: Oct. 20, 2015

(54) IMPLICIT RATINGS

(71) Applicant: Amazon Technologies, Inc., Reno, NV (US)

(72) Inventors: Abhishek Dubey, Seattle, WA (US); Rama Ajit Karve, Bellevue, WA (US); Travis Michael Grigsby, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 328 days.

(21) Appl. No.: 13/676,968

(22) Filed: Nov. 14, 2012

(51) Int. Cl.
*G06F 17/27* (2006.01)

(52) U.S. Cl.
CPC .................................... *G06F 17/27* (2013.01)

(58) Field of Classification Search
None
See application file for complete search history.

(56) References Cited

U.S. PATENT DOCUMENTS

| | | | | |
|---|---|---|---|---|
| 6,108,493 | A * | 8/2000 | Miller et al. | 709/219 |
| 6,438,579 | B1 * | 8/2002 | Hosken | 709/203 |
| 6,947,922 | B1 * | 9/2005 | Glance | 705/26.1 |
| 8,856,165 | B1 * | 10/2014 | Cierniak | 707/767 |
| 2002/0097265 | A1 * | 7/2002 | Kurapati et al. | 345/747 |
| 2008/0279286 | A1 * | 11/2008 | Kobayashi | 375/240.26 |
| 2010/0332329 | A1 * | 12/2010 | Roberts et al. | 705/14.66 |
| 2012/0117581 | A1 * | 5/2012 | Curtis et al. | 725/9 |
| 2012/0245924 | A1 * | 9/2012 | Brun | 704/9 |
| 2013/0031216 | A1 * | 1/2013 | Willis et al. | 709/219 |

* cited by examiner

*Primary Examiner* — Andrea Leggett
*Assistant Examiner* — Tuan S Nguyen
(74) *Attorney, Agent, or Firm* — Thomas Horstemeyer, LLP

(57) ABSTRACT

Disclosed are various embodiments for generating implicit user ratings for a media item. A ratings analyzer tracks user interaction with a network content server configured to present a media item to a plurality of users and then generates an interaction history for each user based at least upon corresponding user interaction with the media item presented by the network content server. A user interaction metric may be generated based at least upon each interaction history associated with the plurality of users and a user interface may be encoded for display where the user interface comprises the user interaction metric.

20 Claims, 8 Drawing Sheets

The Facts: A True Story 103

Run time: 2hr 3 min

| | |
|---|---|
| Number of users with user interaction: | 7,021 |
| Number of users who provided user reviews: | 95 |
| Average stopping point: | 1hr 45 min |
| Average stopping point for incomplete views | 40 min |
| Number of replays initiated: | 107 |

406

| | |
|---|---|
| Number of users who watched previews: | 1,821 |
| Number of users who watched the Previews and the movie | 1,760 |
| Average explicit rating for users who: watched the preview | 4 stars |

409

FIG. 4

234

IMPLICIT RATINGS

BACKGROUND

Users may listen to music, audio books, or watch movies, TV shows, or other media items over a network. Before a user decides whether to select a particular media item for playback, the user may access one or more media item reviews/ratings. In this respect, a particular media item may be associated with one or more reviews/ratings that have been generated by other users. These reviews/ratings may be authored by other users for the purpose of providing explicit feedback about a particular media item. However, it may be the case that a relatively small amount of users provide feedback for a particular media item.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 4 is a drawing of an example of data stored in a data store in the networked environment of FIG. 2 according to various embodiments of the present disclosure.

DETAILED DESCRIPTION

The present disclosure is directed towards managing explicit and implicit user feedback regarding a media item. A media item may be an audio and/or video network content item capable of being presented to a user. For example, a media item may comprise a television show, a movie, an audio book, a song, or any other audio/video program. A user may access a network site that provides media items to the user. In various embodiments, user interaction taken from one or more users with regard to one or more media items may be tracked and stored to generate an interaction history for that particular media item.

Based at least upon the interaction history of a particular media item, various trends, statistical models, or metrics may be determined based at least upon how one or more users interact with the media item. Accordingly, conclusions may be drawn regarding the sentiment users have towards the media item. To this end, a user who is deciding whether to select the media item for presentation may reference implicit user data in making a decision.

Various embodiments of the present disclosure are directed to collecting interaction data for a particular media item, analyzing the interaction data to generate feedback data based at least upon the actions of other users, and providing user information to assist the user in deciding whether to select the media item for presentation. In other embodiments, the interaction data may be collected with respect to a media item series. Interaction data regarding a media item series may provide information to user regarding details about the media item series in addition to any explicit user ratings.

Figure 1:
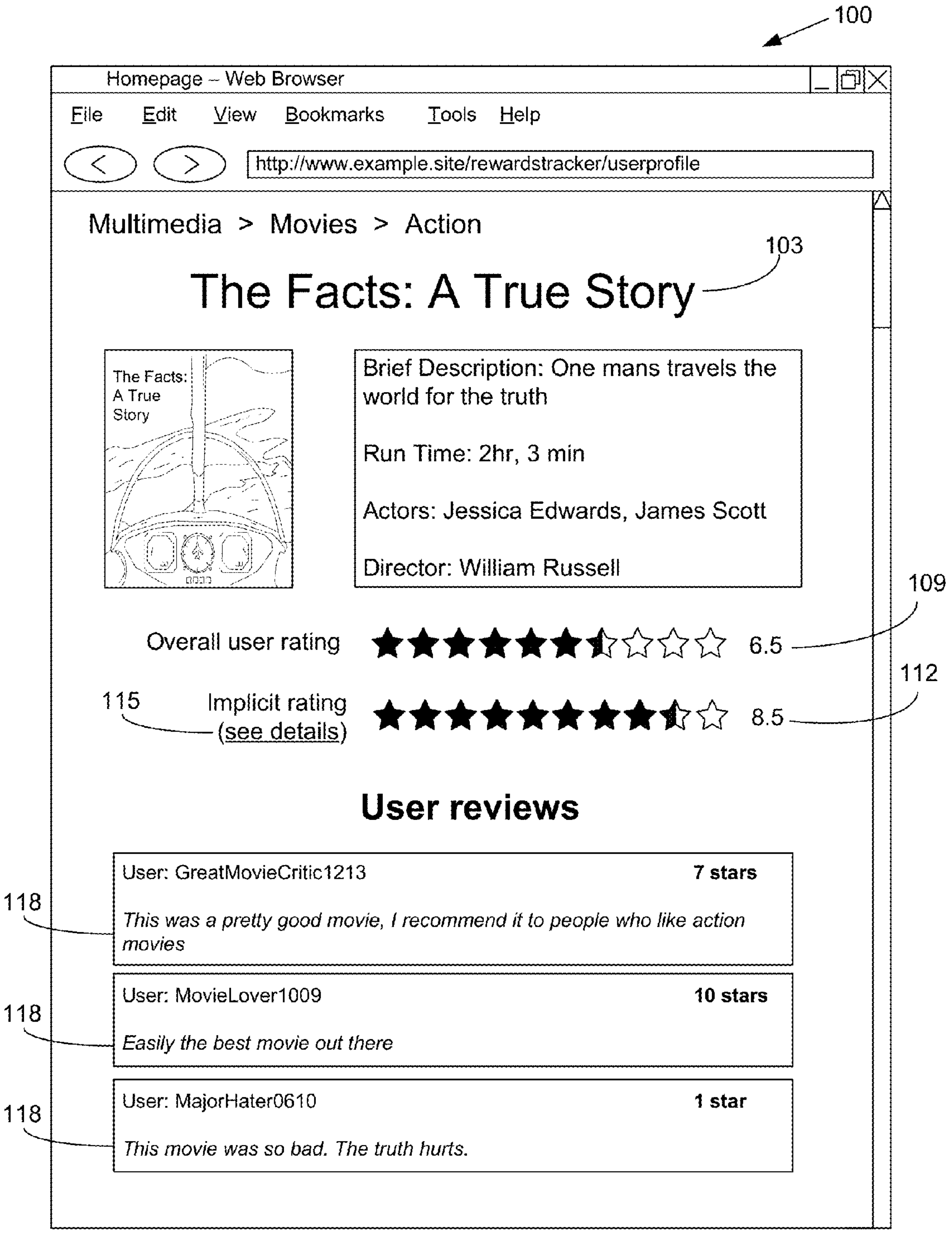
FIG. 1 is a drawing of an example of a user interface according to various embodiments of the present disclosure.

With reference to FIG. 1, an example of a user interface 100 is depicted. The user interface 100 presents details regarding a media item 103. The non-limiting example of FIG. 1 relates to a media item 103 that is an action movie titled "The Facts: A true Story." The user interface 100 may be presented to a user in response to the user selecting the media item 103 for presentation or alternatively, for obtaining details about the media item 103 before a decision is made regarding whether to play back the media item 103. The media item 103 may be associated with various media item details such as, for example, a brief description, a runtime, entities involved with the production of the media item 103, or any other descriptive information that defines the media item 103.

The media item 103 may be associated with an average explicit user rating 109. The average explicit user rating 109 may be generated based at least upon averaging various quantitative user ratings obtained from multiple users. In this respect, users submit a value that quantifies his or her sentiment regarding the media item 103. It may be the case that only a relatively low proportion of the users who have selected the media item 103 for presentation go on to submit explicit user ratings. Thus, the average explicit user rating 109 may capture a small portion of the aggregated user sentiment towards the media item 103. To this end, the average explicit user rating 109 may represent a small sample size.

The media item 103 may be associated with an average implicit user rating 112, according to various embodiments. The average implicit user rating 112 may quantify an average user sentiment based at least upon how users have interacted with the media item 103. To this end, the average implicit user rating 112 may be generated based at least upon a sample size that is larger than the sample size used to generate the average explicit user rating 109. In various embodiments, the average implicit user rating 112 is based at least upon whether one or more users who have completed the presentation of the media item 103, actively engaged in the presentation of the media item 103, restarted the presentation of the media item 103, shared the media item 103 with other users, bookmarked the media item 103, tagged the media item 103, or who have engaged in any other user interaction that reflects a sentiment towards the media item 103.

In various embodiments, the manner in which multiple users interacted with the media item 103 may be quantified as an average implicit user rating 112. Furthermore, user interaction details may be summarized and presented to one or more users via an implicit ratings link 115. The implicit ratings link 115 may navigate a user to a user interface that provides details regarding how users have interacted with the media item 103. To this end, the user may be further assisted in determining whether to select the media item 103 for presentation.

The average explicit user rating 109 and the average implicit user rating 112 may be represented as a bar graph, scale, star rating system, or any other graphical depiction that quantifies a user rating. The user interface 100 depicts the average explicit user rating 109 and the average implicit user rating 112 separately. However, in various embodiments, the average implicit user rating 112 may be graphically overlayed or underlayed with respect to the average explicit user rating 109.

The user interface 100 may provide one or more user reviews 118 in order to assist a user in determining whether to select the media item 103. Each user review 118 may comprise a textual review that is qualitative, a review that is quantitative, or any combination thereof. Each user review 118 may be manually submitted by a user. Thus, it may be the case that many users have selected the media item 103 without providing a user review 118.

In various embodiments of the present disclosure, the order in which user reviews 118 appear in the user interface 100 may be determined at least in part by the manner in which a user interacts with the media item 103. For example, a user review 118 of a user may be compared to the manner in which he or she interacted with the media item 103. If discrepancies exist, then the user review 118 generated by the user may be discounted, de-prioritized, or otherwise removed from consideration. For example, a user who provides a user review 118 that expresses extreme favoritism towards the media item 103 while skipping significant portions of the media item 103 during playback may lead to a determination of discrepancy. In the following discussion, a general description of the system and its components is provided, followed by a discussion of the operation of the same.

Figure 2:
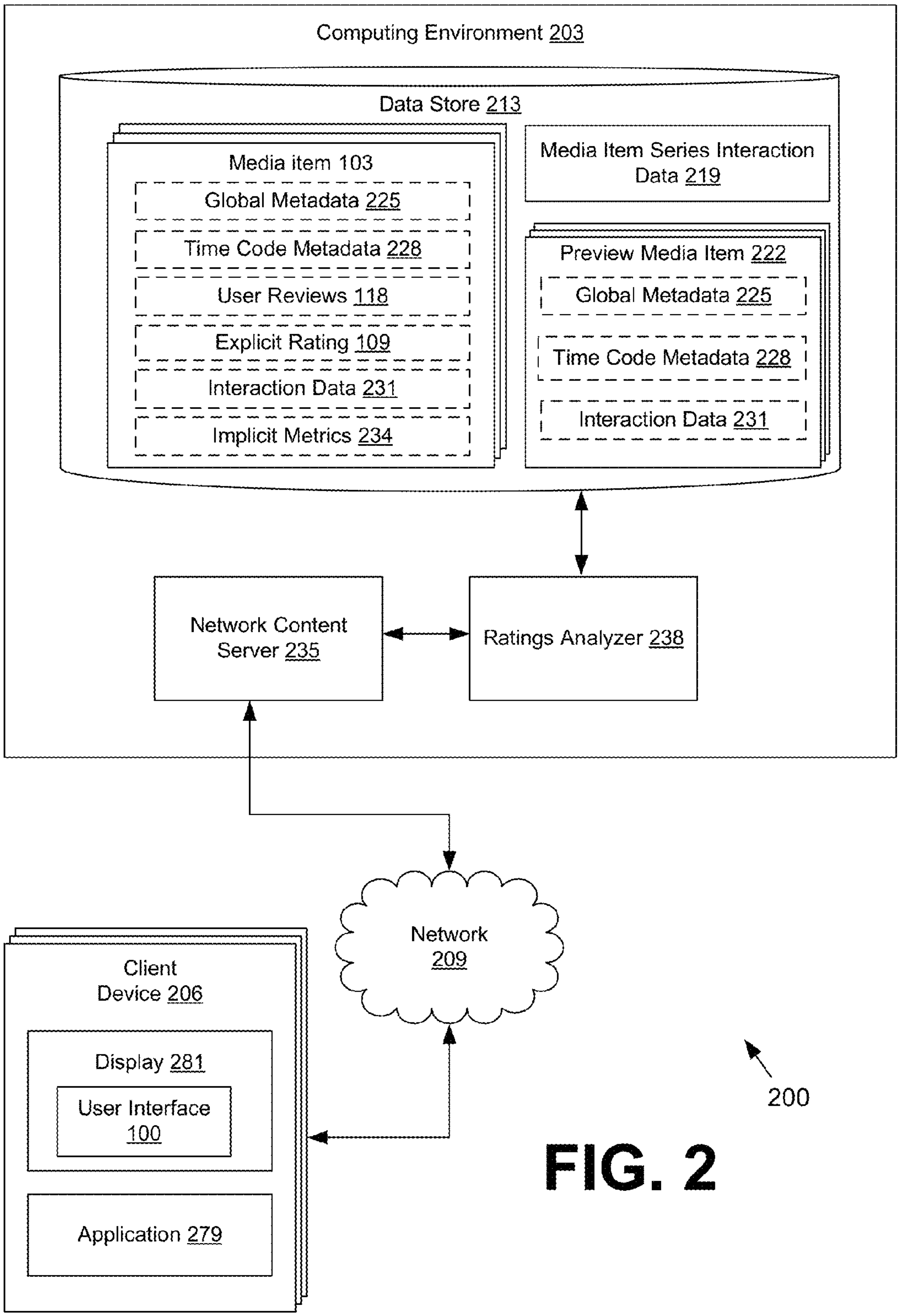
FIG. 2 is a drawing of an example of a networked environment according to various embodiments of the present disclosure.

With reference to FIG. 2, shown is a networked environment 200 according to various embodiments. The networked environment 200 may include a computing environment 203, one or more client devices 206 and possibly other devices in data communication through a network 209. The network 209 may include, for example, the Internet, intranets, extranets, wide area networks (WANs), local area networks (LANs), wired networks, wireless networks, any other suitable networks, or any combination thereof.

The computing environment 203 may comprise, for example, a server computer or any other system providing computing capability. Alternatively, a plurality of computing devices may be employed that are arranged, for example, in one or more server banks, computer banks, or other arrangements. For example, computing environment may comprise a cloud computing resource, a grid computing resource, and/or any other distributed computing arrangement. Such computing devices may be located in a single installation or may be distributed among many different geographical locations.

Various applications and/or other functionality may be executed in the computing environment 203 according to various embodiments. Also, various data may be stored in a data store 213 that is accessible to the computing environment 203. The data store 213 may be representative of a plurality of data stores. The data stored in the data store 213, for example, may be associated with the operation of the various applications and/or functional entities to be described later.

For instance, the data store 213 may include data representing one or more media items 103, media item series interaction data 219, preview media items 222, and other data. Each media item 103 may comprise a television show, a movie, an audio book, a song, or any other audio/video content. Each media item 103 may be characterized by a duration of presentation time or runtime. Media items 103 may be presented to a user in the user interface for selection. Upon selection, the media item 103 may be presented, displayed, played, or otherwise rendered for the user. Thus, a user may watch and/or listen to the content of the media item 103 during the presentation of the media item 103.

Each media item 103 may be associated with global metadata 225, time code metadata 228, one or more user reviews 118, an average explicit rating 109, interaction data 231, implicit metrics 234, or any other data. Global metadata 225 may comprise information that describes the media item 103. For example, global metadata 225 may comprise the runtime, actor information, producer information, writer information, a media item 103 description, one or more genres associated with media item 103, data indicating whether the media item 103 is a portion of a media item series, or any other data. The time code metadata 228 may comprise metadata based at least upon various presentation time points of the media item 103. For example, for a given presentation timestamp of the media item 103, the time code metadata 228 may specify which actors/actresses, music, or any other information is presented to the user. Thus, as the presentation time progresses, the time code metadata 228 for a given presentation timestamp changes.

The media item 103 is associated with one or more user reviews 118 such as, for example, the user reviews 118 of FIG. 1. The media item 103 may be associated with an average explicit rating such as, for example, the average explicit rating 109 of FIG. 1. The media item 103 is associated with interaction data 231. The interaction data 231 may reflect user interaction with the media item 103 for each user. In various embodiments, interaction data 231 is recorded for each user that interacts with the media item 103. Additionally, the media item 103 may be associated with one or more implicit metrics 234. Implicit metrics 234 may be, for example, any trend data, statistical models, histogram data, or any other metric that characterizes how one or more users have interacted with the media item 103. Some specific non-limiting examples of implicit metrics include the number of users who initiated a playback of the media item 103, a percent of viewers who stopped playback of the media item 103 without resuming playback of the media item 103, an average stopping point with regard to the playback of the media item 103, the average percent of time of passive viewership, the percent of users who shared the media item with one or more other users, frequently presented portions of the media item, or any combination thereof.

The media item series interaction data 219 is directed to interaction data associated with a media item series. A media item series may comprise a sequence or series of multiple media items 103. Some non-limiting examples of the media item series are a series of television episodes, a movie series, a set of songs in an album, or any other group of media items 103 that are sequentially ordered according to a predefined structure.

The preview media items 222 may be, for example, previews or summaries for a particular media item 103 or media item series for incentivizing a user to select the media item 103 for presentation. A preview media item 222 may be, for example, a movie trailer or preview to a TV show. To this end, a preview media item 222 directly references a particular media item 103 or media item series. A preview media item 222 may comprise global metadata 225, time code metadata 228, interaction data 231, or any other data related to the preview media item 222.

The components executed in the computing environment 203 include, for example, a network content server 235, a ratings analyzer 238, and possibly other applications, services, processes, systems, engines, or functionality not discussed in detail herein. The network content server 235 is executed to serve up network content such as, for example, web pages, mobile application data, and/or other forms of network content. The network content server 235 may comprise a commercially available hypertext transfer protocol (HTTP) server such as, for example, Apache® HTTP Server, Apache® Tomcat®, Microsoft® Internet Information Services (IIS), and others. It is noted that multiple different network content servers 235 may be employed in the networked environment 200 in various embodiments. For purposes of discussion, the network content server 235 is referred to herein in the singular.

The ratings analyzer 238 may collect data from one or more users in order to generate ratings of media items 103 for users. The ratings analyzer 238 may be configured to encode one or more user interfaces 100 for display to a user. To this end, the ratings analyzer 238 may be configured to operate in conjunction with the network content server 235, a network site, a portal, a mobile application, or dedicated client-side application to provide the services of the ratings analyzer 238 to users. The network site may encode for display network content embodied in some other form that facilitates access to the services offered by the ratings analyzer 238. The network site or portal may include a network page server to serve data such as the network pages to users. Network pages comprising user interfaces may be served to client devices.

The client device 206 is representative of a plurality of client devices that may be coupled to the network 209. The client device 206 may comprise, for example, a processor-based system such as a personal computing device. Such a personal computing device may be embodied in the form of a desktop computer, a laptop computer, a personal digital assistant, a cellular telephone, a set-top box, a music player, a web pad, a tablet computer system, a media player device, or other device with like capability.

The client device 206 may be configured to execute one or more applications 279. In various embodiments of the present disclosure, the application 279 may be dedicated client application, a browser, email applications, instant message applications, and/or other applications. The application 279 may be executed in the client device 206 for example, to access and render network pages, such as web pages, or other network content served up by the computing environment 203 and/or other servers. For example, the application 279 may access content that is transmitted from the network content server 235. The application 279 may also provide a user interface 100 to facilitate interaction with the application 279 and the client device 206. The client device 206 may include a display 281. The display 281 may comprise, for example, one or more devices such as liquid crystal display (LCD) screens, gas plasma-based flat panel displays, LCD projectors, or other types of display devices, etc. The client application 279 may be configured to render a user interface 100 on the display 281.

Next, a general description of the operation of the various components of the networked environment 200 is provided. By employing a ratings analyzer 238, the user interaction by various users with respect to a particular media item 103 or a media item series may be obtained and stored in the data store 213.

The ratings analyzer 238 may be executed in conjunction with a network content server 235 that streams media items 103 to users for presentation and playback. The content presented to the user by the network content server 235 may be presented to users in a user interface 100 to facilitate playback of the media item 103. For example, the network content server 235 may employ playback controls such as, for example, play, stop, pause, resume, volume up, volume down, skip, seek, fast-forward, or any other playback control. As a user manipulates one or more playback controls, the actions of the user may be recorded as interaction data 231. In this respect, a ratings analyzer 238 may obtain interaction data 231 from one or more users as the media item 103 is played back or otherwise presented to a user.

In various embodiments, the interaction data 231 indicates whether a user has performed a playback termination operation. That is to say, initiating playback and then ending playback without restarting playback for predetermined period of time may be deemed as a playback termination operation.

In various embodiments, the interaction data 231 may indicate whether a user is actively or passively interacting with the media item 103. Active/passive interaction may be determined based at least upon the initiation of one or more mute/un-mute operations or volume up/down operations. As another non-limiting example, the deactivation of a playback user interface by minimizing a window or switching away from a playback user interface to another active window may be correlated to portions of the interaction data 231.

A user interface that facilitates the presentation of the media item to users may comprise one or more user interface tools to facilitate purchasing, sharing, tagging, or bookmarking of the media item 103. For example, if a user purchases, shares, tags, or bookmarks the media item 103, such actions/operations may be stored as interaction data 231. For example, the network content server 235 may be executed in conjunction with an electronic commerce system that facilitates a purchasing/rental of the media item 103. Furthermore, the network content server 235 may facilitate a sharing of the media item 103 by allowing a user to post, e-mail, or send a link/address/identifier of the media item 103 to other users. An identifier may be a network identifier such as, for example, a Uniform Resource Locator (URL).

In various embodiments of the present disclosure, a ratings analyzer 238 obtains a user review 118 of a media item from one or more users. Each user review 118 may express a user sentiment that is qualitative, quantitative, or any combination thereof. In various embodiments, a user review 118 by a user may be compared to the corresponding interaction data 231 associated with the user to determine whether there is a discrepancy. Put another way, a user who explicitly reviews a media item 103 while implicitly interacting with the media item 103 in a manner that is contradictory to the user review may result in a determination of discrepancy. In response to a discrepancy, the ratings analyzer 238 may remove, de-prioritize, or otherwise remove the contradictory user review 118 from consideration. In this respect, accurate user reviews 118 are surfaced or prioritized for assisting a user in determining whether to select the media item 103 for presentation.

Additionally, the ratings analyzer 238 may generate one or more implicit metrics 234 that quantify or otherwise summarize the interaction data 231. For example, the interaction data 231 may be obtained according to each individual user interaction with the media item 103. The implicit metrics 234 may be calculated by combining the interaction data 231 across multiple users to generate one or more statistical models or trends. In various embodiments, the ratings analyzer 238 may calculate an average implicit user rating 112 based at least upon interaction data 231 for expressing the extent to which a group of users expressed a favorable sentiment regarding the media item 103. Details relating to the implicit metrics 234 may be presented to the user in a user interface 100. For example, a user may access the implicit metrics 234 via an implicit ratings link 115, as shown in the non-limiting example of FIG. 1.

In various embodiments of the present disclosure the ratings analyzer 238 may obtain media item series interaction data 219 for generating media item series interaction metrics. For example, the ratings analyzer 238 may track user interaction across a media item series for multiple users. An interaction history for the media item series may be generated by the ratings analyzer 238 based at least upon this user interaction. The interaction data for the media item series may indicate a point in the sequence of the media items 103 of the media item series where various users implicitly indicated a point of disinterest in continuing to watch/listen to the media item series.

In further embodiments, the ratings analyzer 238 may determine representative portions of a media item 103 based at least upon the interaction data 231. For example, the ratings analyzer 238 may identify that a portion of the media item 103 has been re-played by a significant number of users. To this end, the ratings analyzer 238 may deem that a particular portion of the media item 103 is associated with a heightened level of interest relative to other portions.

Figure 3:
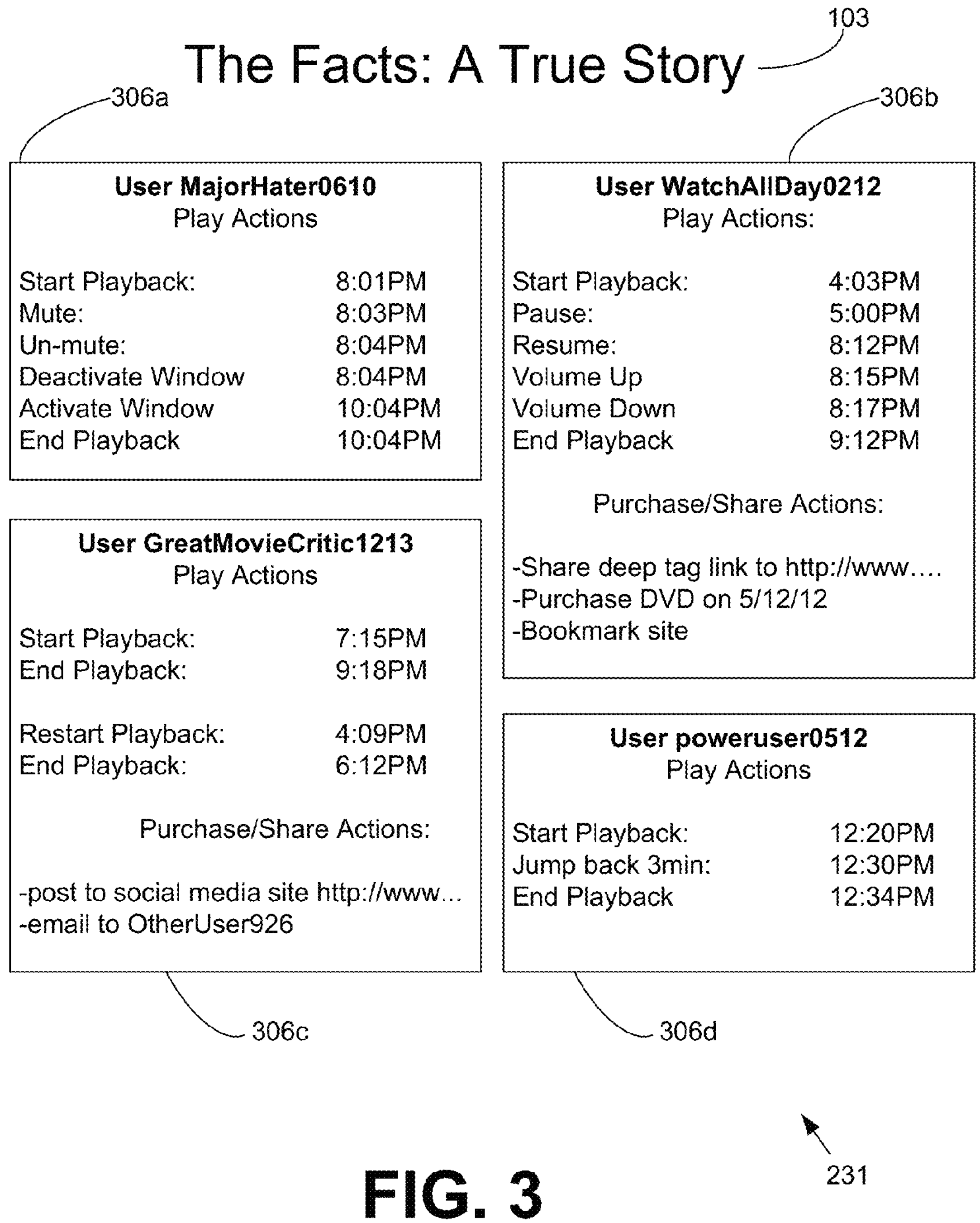
FIG. 3 is a drawing of an example of data stored in a data store in the networked environment of FIG. 2 according to various embodiments of the present disclosure.

Turning now to FIG. 3, shown is an example of data stored in a data store 213 (FIG. 2) in the networked environment 200 (FIG. 2) according to various embodiments of the present disclosure. The non-limiting example of FIG. 3 depicts various pieces of interaction data 231 for a particular media item 103. In various embodiments, the interaction data 231 may be separately maintained for each user 306. The interaction data 231 may be stored in response to a user utilizing a user interface configured to present the media item 103 to the user.

With regard to a first user 306*a*, the interaction data 231 indicates that the first user 306*a* started playing the media item 103 and completed playback of the media item 103. Furthermore, the interaction data 231 of the first user 306*a* indicates that the user muted the presentation of the media item 103 as well as deactivated a user interface that facilitated the presentation of the media item 103 to the first user 306*a*. Deactivation may comprise actions such as toggling away from an active window, minimizing an active window, or any other action that causes the window to lose focus.

In various embodiments of the present disclosure, a ratings analyzer 238 (FIG. 2) obtains the interaction data 231 for determining one or more implicit metrics 234. Implicit metrics 234 may be generated for an individual user such as, for example, a first user 306*a* or may be calculated based at least upon a group of users by aggregating the interaction data 231 for the group of users. In the example of generating an implicit metric 234 for the first user 306*a*, the ratings analyzer 238 may be configured to analyze the interaction data 231 to determine whether the first user 306*a* actively interacted with the media item 103. For example, the ratings analyzer 238 may determine an amount of time of active or passive interaction with the media item 103 based at least upon the interaction data 231.

The ratings analyzer 238 may determine an amount of time or a number of times that the user muted or otherwise attenuated the volume of playback of the media item 103. The ratings analyzer 238 may also measure an amount of time that a playback window that presented the media item 103 was passive or otherwise deselected during playback. These amounts of time may be compared to a predetermined threshold amount to classify the presentation of the media item as passive or active. As shown in the non-limiting example of FIG. 3, the first user 306*a* interacted with the media item 103 while deactivating the playback window for a period of two hours of the two-hour 3 minute runtime. Because a significant portion of the interaction with the media item 103 was passive, the ratings analyzer 238 may classify the first user 306*a* as disinterested in the media item 103. In various embodiments, the ratings analyzer 238 may apply a quantitative score that reflects the degree of disinterest in the media item 103 based at least upon the degree in which a user actively interacted with the media item 103.

If, for example, the first user 306*a* provided a user review 118 (FIG. 1), then the ratings analyzer 238 may compare the implicit metrics 234 of the first user 306*a* with the user review 118 generated by the first user 306*a*. If a discrepancy exists, then the user review 118 authored by the first user 306*a* may be discounted, de-prioritized, or otherwise removed from consideration among a list of user reviews 118. To this end, by comparing implicit metrics 234 of a particular user to a user review 118 authored by the particular user, the user reviews 118 may be validated.

In the non-limiting examples of FIGS. 1 and 3, the first user 306*a* has generated a user review 118 that expresses a disinterest in the media item 103. Furthermore, the first user 306*a* has interacted with the media item 103 by passively engaging in a presentation of the media item 103. Accordingly, the ratings analyzer 238 may deem that the interaction data 231 of the first user 306*a* is consistent with his or her user review 118.

With regard to a second user 306*b*, the interaction history indicates that the second user 306*b* has interacted with the media item 103 by also performing a playback. For example, the second user 306*b* executed a pause operation/action and resumed playback of the media item 103 after a period of three hours and twelve minutes. The ratings analyzer 238 may be configured to analyze durations of time relating to pausing and resuming playback of the media item 103. If the period of time between a pause and a resume operation exceeds a predetermined threshold amount, then the ratings analyzer 238 may conclude that a user is interested in the media item 103. In this respect, a user who wishes to resume playback after significant period of time is likely to have found the media item 103 favorable. That is to say, based at least upon the interaction data 231, it can be inferred that a user decided not to terminate playback after a significant idle period of time.

In various embodiments of the present disclosure, the ratings analyzer 238 is configured to detect portions of a media item 103 that may correlate to a heightened degree of interest. For example, a user who temporarily increases the volume to listen to a portion of the media item 103 may find that the portion is relatively important with respect to the remainder of the media item 103. By determining segments in the media item 103 that correspond to special treatment by the user, a ratings analyzer 238 may identify representative portions of the media item 103. Representative portions such as a clip or segment may be used as a preview of the media item 103.

Additionally, the interaction data 231 indicates that the second user 306*b* executed various actions/operations with regard to the media item 103 such that the actions/operations imply a relatively large degree of interest in the media item 103. For example, the second user 306*b* has performed a deep tag operation for sharing a deep tag with respect to the media item 103. A deep tag operation relates to sharing a network identifier that references the media item 103 with respect to a specific initialization point of the media item 103. For example, a deep tag of the media item 103 may comprise a link to initialize a presentation of the media item 103 at a specified starting point.

In various embodiments of the present disclosure, purchase, share, or bookmarking actions may be interpreted as interaction that implies a favorable sentiment of the media item 103. Such interaction with the media item 103 may be quantified as a score that indicates that the second user 306*b* favors the media item 103. The ratings analyzer 238 may apply one or more scores based at least upon the interaction data 231 to determine an implicit user rating by the user. Scores based at least upon whether a user resumes playback after a predetermined period of time and/or scores based at least upon the purchase/share actions a user has taken with respect to the media item 103 may be combined to generate a total score that quantifies an implicit user rating.

With regard to a third user 306*c*, the interaction data 231 indicates that the third user 306*c* has performed multiple playbacks of the media item 103. The ratings analyzer 238 may be configured to detect the degree in which a user repeats playbacks of the same media item 103. This form of interaction with the media item 103 may imply that a user expresses a favorable sentiment towards the media item 103. To this end, an implied user rating may be determined for the user based at least upon the number of replays of the media item 103.

Furthermore the interaction data 231 of the third user 306*c* indicates that the third user 306*c* has shared, e-mailed, or otherwise posted a network identifier associated with the media item 103 to one or more other users. This form of interaction data 231 may translate to a score that quantifies the degree of interest a user has with respect to a media item 103.

With regard to a fourth user 306*d*, the interaction data 231 indicates that the fourth user 306*d* has replayed a portion of the media item 103. For example, the fourth user 306*d* executed a seek operation for re-playing a segment of the media item 103. The ratings analyzer 238 may consider that the replay of a segment of the media item 103 indicates a user interest in the segment of the media item 103.

In various embodiments of the present disclosure, the ratings analyzer 238 may aggregate the interaction data 231 across various users 306 to determine various trends or statistical models that express a degree of implied user interest in the media item 103. Furthermore, the ratings analyzer 238 may identify one or more segments of the media item 103 based at least upon the manner in which multiple users interact with the media item 103. For example, if a particular portion of the media item 103 is subject to frequent replay, volume adjustments, deep tagging, or any other user interaction, then the ratings analyzer 238 may specify that the segment was subject to special treatment. In this respect, the ratings analyzer 238 may flag the segment as a representative segment.

In various embodiments, the times of particular representative segments may be referenced against time code metadata 228 (FIG. 2) for identifying additional play back trends. For example, the ratings analyzer 238 may identify a point in time associated with playback of the media item 103. To this end, the ratings analyzer 238 may analyze the time code metadata to identify trends such as, for example, sentiment towards particular actors, actresses, or music associated with the media item 103.

Moving next to FIG. 4, shown is an example of data stored in a data store 213 (FIG. 2) in the networked environment 200 of FIG. 2 according to various embodiments of the present disclosure. The non-limiting example of FIG. 4 depicts various implicit metrics 234. A ratings analyzer 238 (FIG. 2) may analyze interaction data 231 (FIG. 2) to determine various implicit metrics 234.

The non-limiting example of FIG. 4 depicts media item implicit metrics 406. Media item implicit metrics 406 express various trends or statistical models in the interaction data 231 with respect to a media item 103. The media item implicit metrics 406 may be determined by aggregating raw interaction data collected from various users to draw various trends or statistical conclusions. For example, a ratings analyzer 238 may determine the number of users who have interacted with the particular media item 103 to express the total number of users. The total number of users may be used to generate various percentages and/or to draw various comparisons with respect to other media items 103.

The ratings analyzer 238 may determine the number of users who provided a user review. The ratings analyzer 238 may calculate an average stopping point with respect to a presentation of media item 103. For example, the ratings analyzer 238 may be configured to determine a termination point with respect to playback of the media item 103 based at least upon whether a user completes playback or prematurely terminates playback. The ratings analyzer 238 may also calculate an average stopping point by excluding users who completed playback of the media item 103. That is to say, among the users who chose not to complete playback of the media item 103, the average stopping point for incomplete presentations of the media item may be calculated. Furthermore, the ratings analyzer 238 may calculate, based at least upon interaction data 231, the number of replays initiated, the number of deep tags, the number of bookmarks, the number of times a link associated with the media item 103 was shared, the percentage or proportion of time that the media item 103 was presented while the user was passively engaged in the presentation, or any other trend.

Thus, various trends, statistics, or quantitative conclusions may be determined based at least upon the manner in which a group of users interacts with the media item 103. The ratings analyzer 238 may be configured to present the implicit metrics 234 to a user. Furthermore, the ratings analyzer 238 may generate an average implicit user rating 112 (FIG. 1) based at least upon the various implicit metrics 234.

In various embodiments of the present disclosure, the implicit metrics 234 comprises preview implicit metrics 409. Statistical models or trends may be calculated based at least upon comparing a user interaction with a preview media item 222 (FIG. 2) and a user interaction with the corresponding media item 103. For example, a media item 103 may be a movie titled "The Facts: A True Story" and the corresponding preview media item 222 may be a movie trailer for "The Facts: A True Story."

The ratings analyzer 238 may determine the number of users who watched a preview media item 222. The ratings analyzer 238 may also determine the number of those users who also watched the corresponding media item 103. By comparing these two numbers, the ratings analyzer 238 may determine the effectiveness of the preview media item 222 with regard to promoting the corresponding media item 103. For example, if the number of users who played back the preview media item 222 is relatively close to the number of people who played back both the preview media item 222 and the media item 103, then it may be inferred that the preview media item 222 is effective.

In addition, the average user rating of those users who played back both the preview media item 222 and the media item 103 may be determined. This average user rating may indicate a quantitative sentiment towards the media item 103. In the non-limiting example of FIG. 4, it can be inferred that the preview media item 222 was effective because a large percentage of people who played back the preview media item 222 continued on to playback the media item 103. However, the average explicit rating 109 (FIG. 1) from those users may be relatively low. In this case, it may be inferred that the preview media item 222 successfully promoted the corresponding media item 103, however, the corresponding media item 103 did not deliver the expectations set by the preview media item 222. In this scenario, the ratings analyzer 238 may determine that the preview media item 222 has an overall negative effect on the media item 103. In response, the preview media item 222 may be removed from selection such that users are unable to access the preview media item 222. To summarize, a determination may be made as to whether to include the preview media item in response to analyzing the preview implicit metrics 409.

Figure 5:
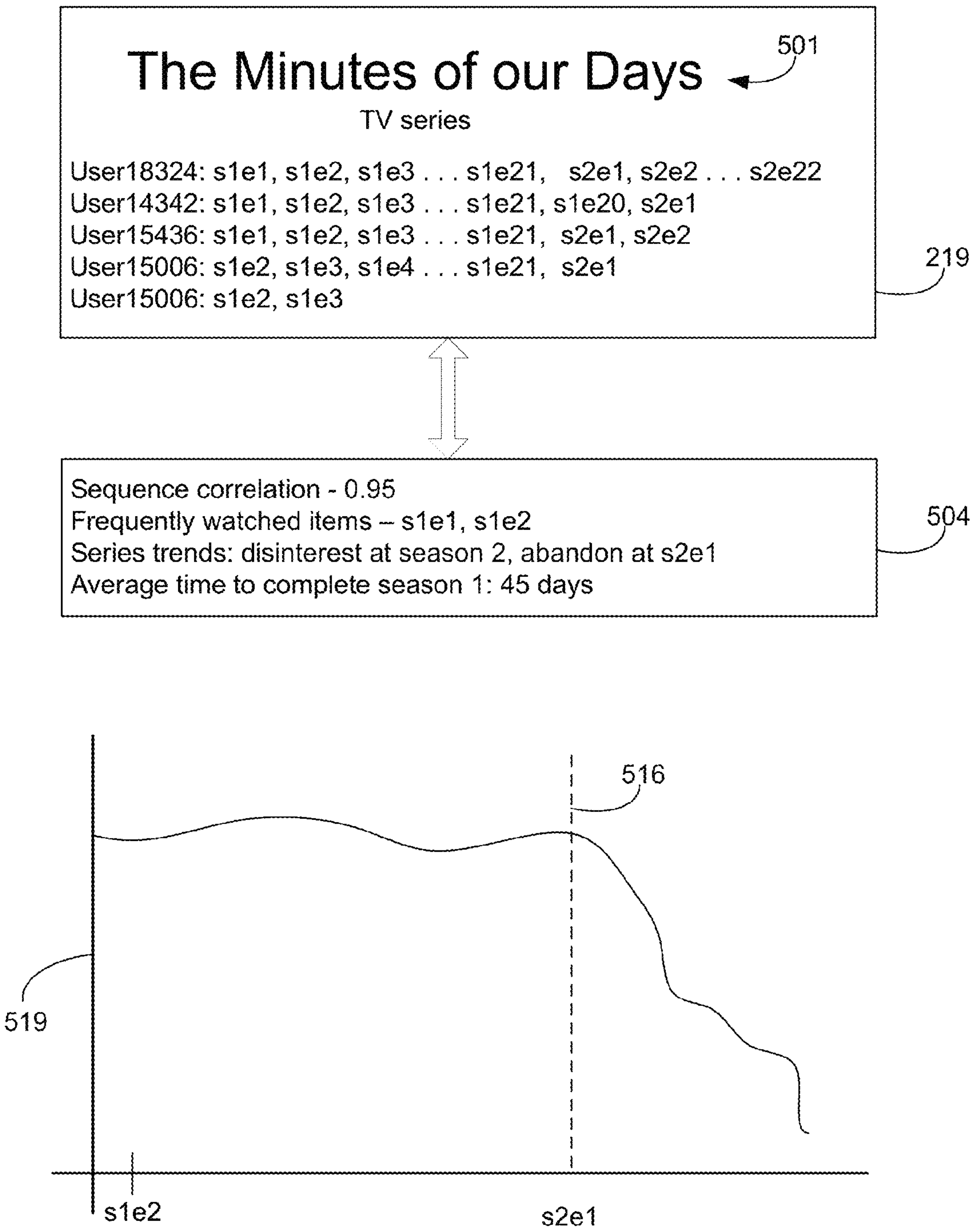
FIG. 5 is a drawing of an example of data stored in a data store in the networked environment of FIG. 2 according to various embodiments of the present disclosure.

Moving next to FIG. 5, shown is an example of data stored in a data store 213 (FIG. 2) in the networked environment 200 of FIG. 2 according to various embodiments of the present disclosure. Specifically, the non-limiting example of FIG. 5 depicts media item series interaction data 219 based at least upon the presentation of a media item series 501. The ratings analyzer 238 (FIG. 2) may be configured to determine one or more media item series metrics 504 based at least upon the media item series interaction data 219. The media item series metrics 504 may be presented to potential users for assisting the potential users in making a determination whether to select portions of the media item series 501 for presentation.

The media item series 501 may comprise multiple sequentially ordered media items 103 (FIG. 1). In the non-limiting example of FIG. 5, each media item 103 in the media item series 501 is denoted with an "s" associated with a season number and an "e" associated with an episode number. Accordingly, each media item 103 may be sequentially ordered in terms of a season number and/or episode number. The ratings analyzer 238 may be configured to obtain media item series interaction data 219 that reflects an order that the media items 103 within the media item series 501 were presented in practice.

For example, a user who plays back a media item series 501 may playback each media item 103 in an order chosen by the user. However, although a user may choose the order of presentation, a pre-existing sequential order may be used to organize the media item series 501. By deviating from this pre-existing sequence, the user experience of playing back the media item series 501 may be varied.

In various embodiments, the ratings analyzer 238 determines one or more media item series metrics 504 that quantify the user interaction with respect to the media item series 501. For example, the ratings analyzer 238 may calculate a sequence correlation. The sequence correlation expresses the degree in which a group of users plays back each media item of the media item series 501 according to the pre-existing sequence. To this end, a high sequence correlation indicates that a significant number of users follow the pre-existing sequence.

The ratings analyzer 238 may determine one or more frequently watched media items within the media item series 501. The ratings analyzer 238 may be configured to promote, elevate, surface, or otherwise prioritize particular media items within the media item series 501 to potential users. The ratings analyzer 238 may employ any number of statistical calculations for determining frequently presented media items 103 among the media item series 501.

Furthermore, the ratings analyzer 238 may determine an average time to complete presentation of at least a portion of the media item series 501. For example, the average number to complete presentation of a particular season of the media item series 501 may indicate to potential users the favorability of the media item series 501.

The ratings analyzer 238 may further be configured to generate a series trend that reflects a viewership frequency for each media item 103 in the media item series 501. Accordingly, the ratings analyzer 238 may determine a point of disinterest 516 in the media item series 501. For example, the ratings analyzer 238 may determine a respective playback frequency 519 for each media item within the media item series based at least upon the media item series interaction data 219. The ratings analyzer 238 may then determine the point of disinterest 516 by analyzing a rate of change across each respective playback frequency 519. If the rate of change in playback frequency 519 changes with respect to a predetermined threshold, then the ratings analyzer 238 may identify the point in which the rate of change in playback frequency 519 exceeds a predetermined threshold as the point of disinterest 516. To this end, the ratings analyzer 238 may identify unpopular or unfavorable sequential portions of the media item series 501 such as, for example, a season associated with the media item series 501.

Figure 6:
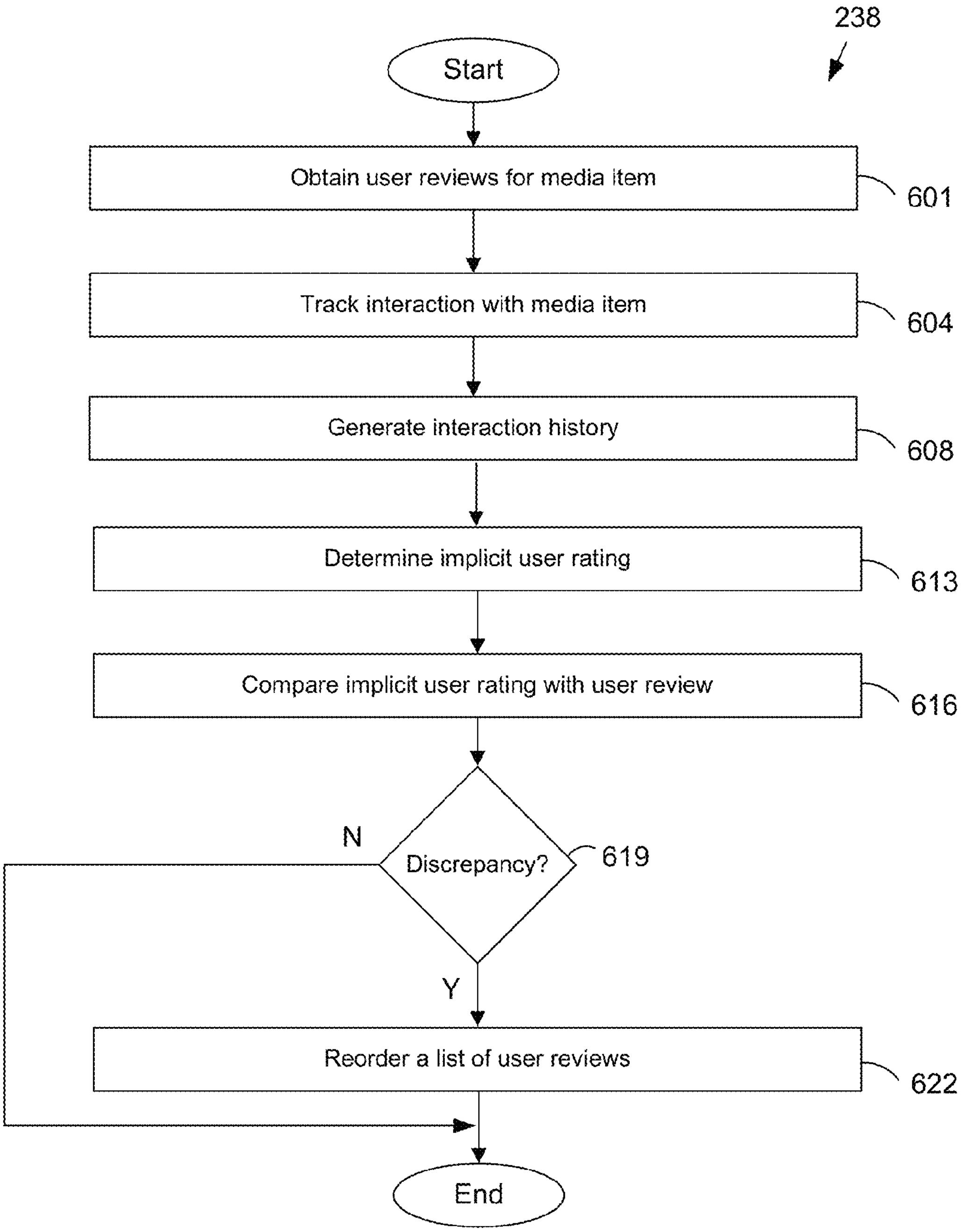
FIG. 6 is a drawing of a flowchart that provides one example of the operation of a ratings analyzer implemented in the networked environment of FIG. 2 according to various embodiments of the present disclosure.

Referring next to FIG. 6, shown is a flowchart that provides one example of the operation of a portion of a ratings analyzer 238 according to various embodiments. It is understood that the flowchart of FIG. 6 provides merely an example of the many different types of functional arrangements that may be employed to implement the operation of the portion of the ratings analyzer 238 as described herein. As an alternative, the flowchart of FIG. 6 may be viewed as depicting an example of steps of a method implemented in the computing environment 203 (FIG. 2) according to one or more embodiments.

Beginning with block 601, the ratings analyzer 238 obtains user reviews 118 (FIG. 1) for a media item 103 (FIG. 1). User reviews 118 may be provided manually by various users such that a user review 118 may express the sentiments of a user qualitatively, quantitatively, or any combination thereof. In block 604, the ratings analyzer 238 tracks interaction with the media item 103 for a particular user. For example, the particular user interacts with the media item 103 such as, for example, by initiating actions or operations associated with a network content server 235 (FIG. 2) that streams the media item 103 to the user. Accordingly, the ratings analyzer 238 may track such actions or operations as the user interacts with the network content server 235.

Next, in block 608, the ratings analyzer 238 generates an interaction history. The interaction with the media item 103 may be stored for the user as interaction data 231 (FIG. 2). The interaction data 231 may comprise a history or record that accounts for operations or actions taken by the user with respect to playing back the media item 103.

In block 613, the ratings analyzer 238 determines an implicit user rating. The ratings analyzer 238 may analyze the interaction data 231 to determine one or more statistical models or trends that quantify the interaction of a user associated with the media item 103. For example, the degree in which a user replays, pauses/resumes, posts, purchases, shares, etc., a particular media item 103 may be quantified to indicate whether the user favors the media item 103. To this end, an implicit user rating may be generated for each user. The actions or operations taken by a particular user may be quantified and weighted to generate the implicit user rating for the user. In various embodiments, the implicit user rating for each user among the users may be combined with one another to generate an average implicit user rating 112 (FIG. 1).

In block 616, the ratings analyzer 238 compares the implicit user rating of a particular user with the user review of the particular user. For example, a user that has explicitly provided a user review of the media item 103 may have taken particular actions with respect to playing back the media item 103. As shown in block 619, the ratings analyzer compares the implicit actions with the explicit actions of the user to determine whether a discrepancy exists. The ratings analyzer

238 may determine that a discrepancy exists if the implicit user rating differs from the user review according to a predetermined threshold amount. That is to say, the difference between the implicit user rating and user review is measured and then compared to a predetermined threshold. If a discrepancy exists, the ratings analyzer 238 branches to block 622.

In block 622, the ratings analyzer 238 reorders a list of user reviews. The ratings analyzer 238 may de-prioritize or remove a particular user review from a user review list if that particular user review is associated with a discrepancy. As a result, accurate user reviews may be surfaced to the top of the user review list. However, if a discrepancy does not exist, then the ratings analyzer 238 takes no action.

Figure 7:
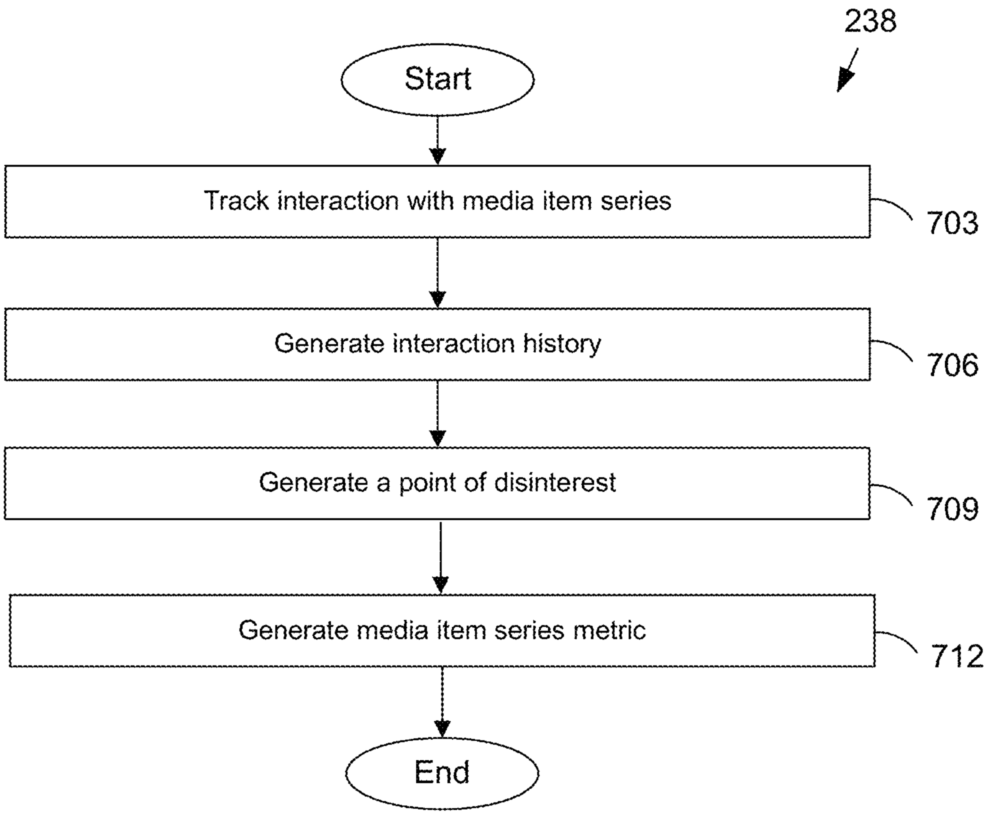
FIG. 7 is a drawing of a flowchart that provides one example of the operation of a ratings analyzer implemented in the networked environment of FIG. 2 according to various embodiments of the present disclosure.

Turning now to FIG. 7, shown is a flowchart that provides one example of the operation of another portion of a ratings analyzer 238 according to various embodiments. It is understood that the flowchart of FIG. 7 provides merely an example of the many different types of functional arrangements that may be employed to implement the operation of the other portion of the ratings analyzer 238 as described herein. As an alternative, the flowchart of FIG. 7 may be viewed as depicting an example of steps of a method implemented in the computing environment 203 (FIG. 2) according to one or more embodiments.

Beginning with block 703, the ratings analyzer 238 tracks an interaction with a media item series. A media item series may comprise a group of media items 103 (FIG. 1) that are ordered according to a predetermined sequence. The ratings analyzer 238 may track the degree in which one or more users actively playback media items 103 included in the media item series.

In block 706, the ratings analyzer 238 generates an interaction history. The interaction history may comprise media item series interaction data 219 (FIG. 2) such that the interaction history provides a record of playback instances of the media items 103 of the media item series. In block 709, the ratings analyzer 238 generates a point of disinterest 516 (FIG. 5) in the media item series. The point of disinterest 516 may indicate a portion of the media item series associated with a low amount of user interaction associated with a local minimum. The point of disinterest 516 may also indicate a point in which a group of users have lost interest in the media item series. The point of disinterest 516 may be calculated by analyzing the respective frequency of playback of each media item 103 within the media item series. Furthermore, the rate of change of the respective frequency may be analyzed across the media item series to determine a point of disinterest 516. To this end, particular episodes or seasons associated with the media item series may be deemed as unpopular based at least upon multiple users.

In block 712 the ratings analyzer 238 generates a media item series metric such as, for example, the media item series metric 504 of FIG. 5. The media item series metric 504 may comprise the point of disinterest, a sequence correlation, one or more frequently played media items, and average time to complete playing the media item series, or any other metric that quantifies the interaction of the media item series associated with the users. The series metric correlation may quantify the degree in which users play the media item series according to a predetermined sequence of media items 103 in the media items series.

In various embodiments, the point of disinterest 516 is calculated for media item series that have a sequence correlation that exceeds a pre-defined threshold value. If the media item series is associated with a relatively large sequence correlation, it can be inferred that users prefer to playback the media item series in a particular order. Accordingly, a point of disinterest 516 in the media item series may be helpful to users when deciding whether to select a portion of the media item series for playback for a media item series with a relatively large sequence correlation.

Figure 8:
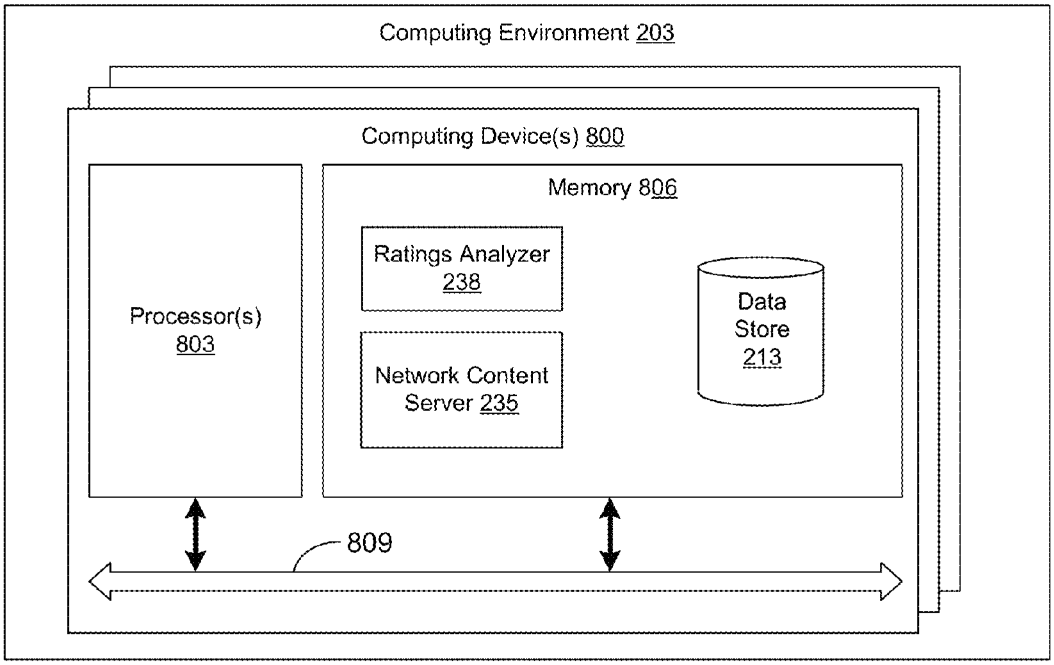
FIG. 8 is a schematic block diagram that provides one example illustration of a client device employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 800. The computing device 800 includes at least one processor circuit, for example, having a processor 803 and a memory 806, both of which are coupled to a local interface 809. To this end, the computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the network content server 235, ratings analyzer 238, and potentially other applications. Also stored in the memory 806 may be the data store 213 and other data.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network 209 (FIG. 2) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the ratings analyzer 238 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowcharts of FIGS. 6 and 7 show the functionality and operation of an implementation of portions of the ratings analyzer 238. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the ratings analyzer 238, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying an application executable in a computing device, comprising:

code that tracks a plurality of interactions with a media item to generate an interaction history associated with a user account;

code that determines an implicit rating of the media item corresponding to the user account, wherein the implicit rating is based at least in part upon the interaction history;

code that determines that the implicit rating differs from a submitted rating for the media item associated with the user account by more than a predetermined threshold amount;

code that removes the submitted rating from a list of submitted user ratings in response to determining that the implicit rating differs from the submitted rating by more than the predetermined threshold amount; and code that generates a network page comprising the implicit rating and the list of submitted user ratings.

2. The non-transitory computer-readable medium of claim 1, wherein the plurality of interactions comprise at least one of a playback termination operation, a muting operation, a playback user interface deactivation operation, or a fast forward operation.

3. The non-transitory computer-readable medium of claim 1, wherein the code that determines the implicit rating comprises code that compares a duration of time associated with at least one of the plurality of interactions with a predetermined threshold of time.

4. The non-transitory computer-readable medium of claim 1, further comprising:

code that identifies a point in time associated with a presentation of the media item, wherein the point in time is identified based at least in part upon one or more of the plurality of interactions; and code that references time code metadata of the media item according to the point in time to identify a trend.

5. The non-transitory computer-readable medium of claim 4, wherein the trend relates to at least one of an actor or actress associated with the point in time of the media item.

6. A system, comprising:

at least one computing device; and an application executable in the at least one computing device, the application comprising:

logic that tracks a plurality of interactions with a media item provided by a network content server;

logic that generates an interaction history based at least in part upon corresponding ones of the plurality of interactions with the media item, wherein the corresponding ones of the plurality of interactions are recorded by the network content server;

logic that generates a metric based at least in part upon the interaction history;

logic that generates a first score based at least in part on the generated metric;

logic that generates a second score based at least in part on a previously submitted rating of the media item;

logic that determines that the first score differs from the second score by more than a predetermined threshold amount;

logic that removes the previously submitted rating of the media item from a list of submitted user ratings in response to a determination that the first score differs from the second score by more than the predetermined threshold amount; and logic that generates a network page associated with the media item, wherein the network page comprises the first score and the list of submitted user ratings.

7. The system of claim 6, wherein the metric comprises at least one of: a proportion of a plurality of users that terminated playback of the media item prior to completion of the media item, a proportion of the plurality of users that replayed the media item, or an average playback termination point in the media item.

8. The system of claim 6, wherein at least one of the plurality of interactions comprises at least one of a volume adjustment, a pause operation, a resume operation, a fast forward operation, or a seek operation.

9. The system of claim 6, wherein at least one of the plurality of interactions comprises at least one of a link sharing action for sharing a network identifier associated with the media item, a bookmark operation for bookmarking the network identifier associated with the media item, a purchase action for purchasing the media item via an electronic commerce system, or a deep tagging operation using the network identifier associated with the media item.

10. The system of claim 6, wherein the plurality of interactions comprise a first plurality of interactions and the application further comprises:

logic that tracks a second plurality of interactions with a preview media item, the preview media item corresponding to a preview of the media item; and logic that generates a preview interaction history based at least in part upon the second plurality of interactions with the preview media item.

11. The system of claim 10, wherein the application further comprises logic that generates a preview interaction metric based at least in part upon the preview interaction history.

12. The system of claim 11, wherein the preview interaction metric comprises at least one of a first quantity of views of the preview media item or a ratio comprising a second quantity of views of the media item in comparison to the first quantity of views of the preview media item.

13. The system of claim 11, wherein the application further comprises logic that obtains a respective rating of the media, wherein the preview interaction metric comprises an average rating among a subset of ratings of the preview media item.

14. The system of claim 6, wherein the metric comprises an implicit rating that expresses an average quantitative user sentiment associated with the media item.

15. The system of claim 6, wherein the application further comprises logic that determines a representative segment of the media item based at least in part upon the interaction history, the representative segment indicating a first portion of the media item that is more frequently played than a second portion of the media item.

16. A method, comprising:

tracking, in at least one computing device, an interaction with a media item series associated with playback of the media item series;

generating, in the at least one computing device, an interaction history based at least in part upon the interaction with the media item series;

generating, in the at least one computing device, a first rating based at least in part upon the interaction;

generating, in the at least one computing device, a second rating based at least in part on a plurality of reviews submitted for the media item series; and determining, in the at least one computing device, that the first rating differs from the second rating by more than a predetermined threshold amount;

removing, in the at least one computing device, at least one user review from the plurality of reviews in response to determining that the first rating differs from the second rating by more than the predetermined threshold amount; and generating, in the at least one computing device, a network page associated with the media item series, wherein the network page comprises the first rating and the plurality of reviews.

17. The method of claim 16, wherein the first rating comprises a number of users that have played the media item series in a predetermined sequence.

18. The method of claim 16, wherein the first rating indicates a most frequently played media item in the media item series.

19. The method of claim 16, further comprising:

determining, in the at least one computing device, a respective frequency of playback for each media item within the media item series based at least in part upon the interaction history; and determining, in the at least one computing device, a point of disinterest in the media item series based at least in part upon a rate of change across each respective frequency, wherein the first rating comprises the point of disinterest.

20. The method of claim 16, wherein the first rating comprises an average time to complete playback of at least a portion of the media item series.

* * * * *